April 10, 1934.　　J. E. LILIENFELD　　1,954,636

ELECTROLYTIC CONDENSER

Filed June 19, 1930

INVENTOR
JULIUS EDGAR LILIENFELD
BY
ATTORNEY

Patented Apr. 10, 1934

1,954,636

UNITED STATES PATENT OFFICE 1,954,636

ELECTROLYTIC CONDENSER

Julius Edgar Lilienfeld, Winchester, Mass.

Application June 19, 1930, Serial No. 462,250

4 Claims. (Cl. 175—315)

The invention relates to electrical condensers, more especially to condensers of the electrolytic type; and it has for its object a construction of electrolytic condenser which will insure more uniform performance and a longer life of the cell.

In electrolytic condensers, as generally constructed, the filmed anode is supported and electrically connected by means of a stem or riser member which passes upwardly through a cover sealing the jar or container of the cell, said stem entering the electrolyte through its surface. The particular portion of the stem which is thus located above the level of the electrolyte is a source of considerable trouble in condenser operation, as sparking tends to occur above the electrolyte level and cause an unsteady operation of the condenser as well as a destructive action upon the riser itself. As a matter of fact, the riser will often be eaten through and the anode drop off into the electrolyte long before the normal expected life of the condenser will be completed.

Moreover, crystallization of the salts contained in an electrolyte will develop upon the riser and thus further increase the possibilities of sparking thereat, as well as to make for unsteadiness of operation. Temperature changes also affect the electrolyte level, as well as do incidental vibrations; and in the course of time this level will be depressed and the area thus wetted thereby will be changing continually. The riser film will correspondingly be formed and lost, which action results in variation of the leakage current through the condenser and will thus contribute to the final destruction of the condenser.

I found that soft rubber, if pressed sufficiently against an aluminum surface, will prevent all the drawbacks hereinbefore noted, particularly if the aluminum area against which this pressure is exerted be formed (polarized) before being surrounded by the rubber. To accomplish this conveniently the riser is to be provided with a shoulder for location within the cell, said shoulder being adapted to tighten against a soft rubber gasket or the like, and the condenser as a whole being operated in such a position (inverted) that all of the elements are totally immersed in the electrolyte. By this expedient, the rubber gasket will act to insulate the outgoing riser portion from the electrolyte; and no portion thereof beyond the gasket and within the cell will be exposed to the difficulties aforesaid. It is preferred, also, to polarize or form the riser beyond the shoulder portion before assembling the condenser so that the said gasket tightens or seals against a formed area.

The container for the electrolyte at all times is to be filled to such an extent that its level will be above the upper portion of the electrode (filmed anode); and suitable provision may be made at the top of the container above the level of the electrolyte for venting the condenser. It will thus be noted that the venting device is not provided at the same portion or cover of the condenser at which the electrode enters or is electrically connected, as is the general practice, but rather at an opposite portion.

The nature of the invention, however, will best be understood when described in connection with the accompanying drawing, in which.

Figure 1:
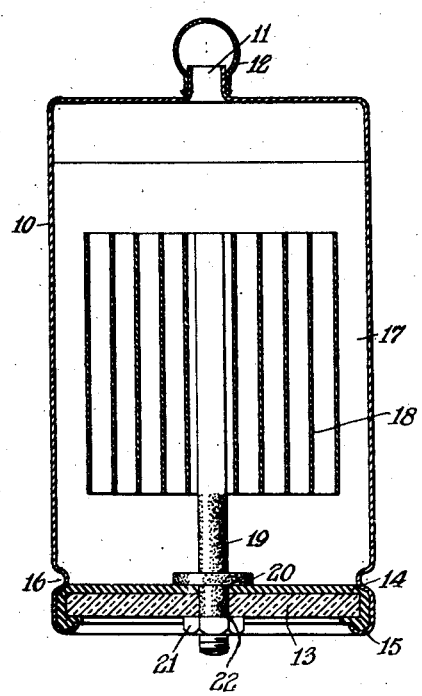
Fig. 1 is a vertical section of an electrolytic condenser constructed in accordance with the invention.

Referring to the drawing, more especially Fig. 1 thereof, 10 designates a suitable container, which is preferably of metal to form one of the electrodes (cathode) of the condenser, the same being shown in inverted position with a small tubular outlet 11 provided in the bottom (top of condenser) and covered by a punctured rubber cap 12 serving as a vent for said condenser. At the bottom of the condenser (normal top of the container) the condenser is closed by a cover plate or washer 13 overlaid with a gasket 14 of soft rubber or other resilient and insulating material, the gasket and cover member being secured in position by turning inwardly or crimping over the edge 15 of the container to force same against a circumferential inwardly-directed shelf 16 of the container.

In accordance with the invention, the container 10 which receives the electrolyte 17 is to be operated in an inverted position with vent 11 opening through the normal bottom of the container, as shown; and the other electrode (filmed anode) 18 is to be located in the said electrolyte so as to be at all times totally immersed therein. To support this anode thus, the stem or riser 19 therefrom is brought through the gasket 14 and cover 13 for external connection and is provided intermediate its ends with a shoulder 20 designed to contact with the inner face of the gasket 14, being firmly drawn thereto, and thus firmly holding the anode in position, by means of a nut 21 fitting over the outer threaded end of the riser and taking up against the cover 13.

By this expedient, the riser is substantially prevented from contacting with the electrolyte over its outgoing surface; but it is preferred to also form or polarize the surface of the riser and shoulder, the polarization of the former continuing for a short distance beyond the shoulder, as indicated at 22, so that the gasket tightens up entirely against a formed area.

Figure 2:
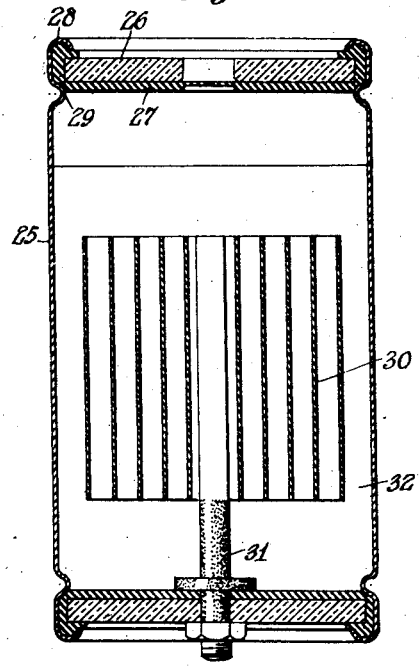
Fig. 2 is a similar view illustrating a modification.

In Fig. 2 a similar construction is illustrated with the exception that the container is in the nature of a tube or hollow cylinder 25, the vent end being closed by a cover member 26 and perforated gasket 27 (acting as a vent) by turning inwardly or crimping over the corresponding edge 28 of the container and tightening the gasket and cover against the circumferential inwardly-directed shelf 29 of the container. The opposite end is closed in exactly the same manner as described in connection with the container shown in Fig. 1; and the anode 30 and riser 31 within the container are totally immersed in the electrolyte 32 of the condenser.

Figure 3:
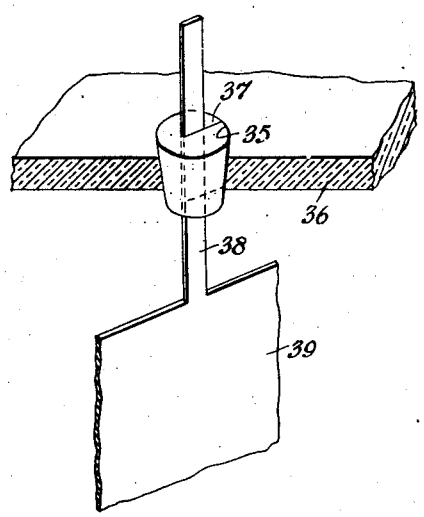
Fig. 3 is a fragmentary view, in perspective, illustrating a modification in the riser outlet seal.

Referring to Fig. 3 of the drawing, a slightly different means of taking a riser from the anode is indicated. In this embodiment, an opening 35 is provided in a cover member 36 and the same is adapted to receive a plug or stopper 37 of resilient material, such as soft rubber, and preferably having a tapered fit therein, said stopper being vertically split in a radial direction from its periphery slightly beyond the axis of the plug. The stem or riser 38 from the anode 39 in this instance is then constructed as a flat tab or strip which will fit into the split portion of the stopper, the latter squeezing the same and holding it tightly in position when said stopper is inserted into the cover for sealing a container.

A condenser constructed and operated in the position hereinbefore described will insure more uniform performance and will have a greatly increased life.

The specific construction set forth in Fig. 2, furthermore, allows of forming the anodes in situ before applying the cover member, so that no handling of these anodes is involved once the film is formed thereon. This admits of conducting the forming operation in an electrolyte more suitable thereto than the final electrolyte of the cell, the former electrolyte being discarded and cell flushed out with water after the forming operation and before introducing the final electrolyte therein. Whereupon, the cover member is sealed to the cylinder as set forth.

I claim:

1. An electrolytic condenser, comprising a container constituting a cathodic electrode and adapted to retain a liquid electrolyte, a closure member for the container, and an anodic electrode within the container and having an extension passing through the closure member, the said anodic electrode and portion of the extension between same and the closure member being immersed in the electrolyte, and the extension being polarized beyond its entrance into the closure member.

2. An electrolytic condenser, comprising a container provided with a vent at one end, said container constituting a cathodic electrode and adapted to retain a liquid electrolyte, the closure member for the container including a soft rubber gasket, an anodic electrode within the container and having an extension passing through the closure member and sealed by contact with said gasket thereof, said extension being provided with an intermediate shoulder and threaded at its outer end, and said anodic electrode and portion of the extension between the same and the gasket being immersed in the electrolyte and the said extension polarized beyond its entrance into the gasket, and a nut working over the threaded end of the extension to draw the shoulder thereof against the closure member.

3. In an electrolytic condenser: a container for a liquid electrolyte, sealing means for preventing egress of the electrolyte from the container, and an anodic electrode mounted within the container with a polarized portion thereof extending through the said sealing means.

4. In an electrolytic condenser: a container for a liquid electrolyte, sealing means for preventing egress of the electrolyte from the container, and an anodic electrode mounted within the container and having a portion thereof extending through the said sealing means and polarized beyond its entrance therein.

JULIUS EDGAR LILIENFELD.